United States Patent [19]

Westberg

[11] Patent Number: 4,728,127

[45] Date of Patent: Mar. 1, 1988

[54] PIPE JOINT

[75] Inventor: Alvar T. Westberg, Svärdsjö, Sweden

[73] Assignee: Sandvik AB, Sandviken, Sweden

[21] Appl. No.: 922,670

[22] Filed: Oct. 24, 1986

[30] Foreign Application Priority Data

Oct. 25, 1985 [SE] Sweden .................. 8505031

[51] Int. Cl.⁴ ............................................. A16L 35/00
[52] U.S. Cl. .................................. 285/39; 285/332.3;
285/355; 285/424; 285/906
[58] Field of Search .................. 285/355, 390, 39, 349,
285/903, 906, 424, 333, 332.2, 332.3

[56] References Cited

U.S. PATENT DOCUMENTS 2,150,221  3/1939  Hinderliter ................. 285/333 X
2,476,656  7/1949  Golbraith ..................... 285/390 X
3,041,077  6/1962  Osterloh et al. ............. 285/230 X

FOREIGN PATENT DOCUMENTS 74851  1/1961  France ......................... 285/355

Primary Examiner—Dave W. Arola
Attorney, Agent, or Firm—Burns, Doane, Swecker & Mathis

[57] ABSTRACT

A pipe joint for thin-walled tubes (13, 14) is provided for transmission of water. The pipe joint includes a male portion (11) and a female portion (12) both of which having pressure cut threads (18, 21). At mounting thereof these portions (11, 12) are threadably engaged so that a seal ring (25) received in an annular extension (23) of the female portion (12) is brought into engagement with a conical portion (16) of said male portion (11) so as to provide tightening of said pipe joint.

7 Claims, 5 Drawing Figures

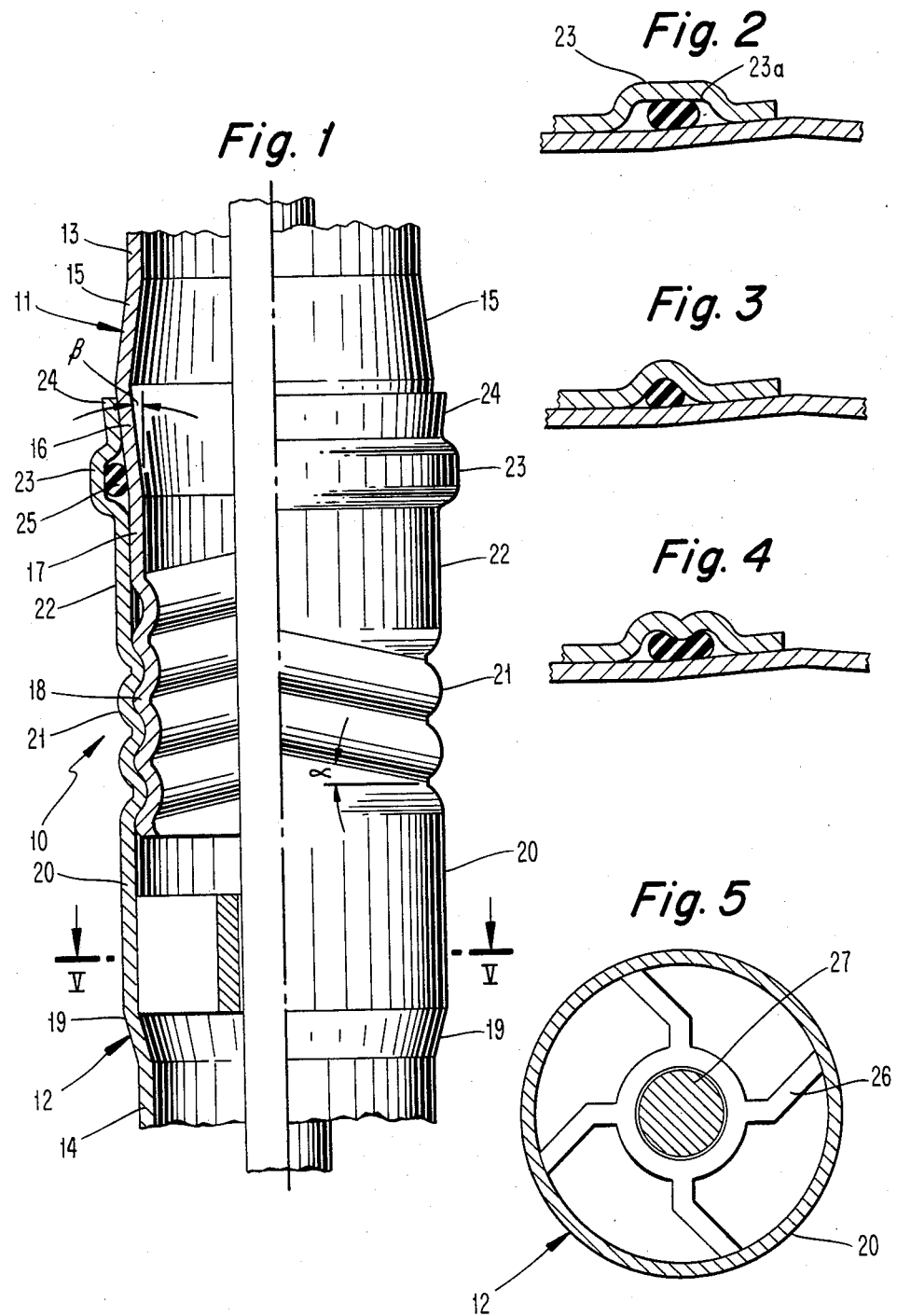

PIPE JOINT

FIELD OF THE INVENTION

The present invention relates to a pipe joint between a first pipe with small wall thickness and a second pipe with small wall thickness and a first pipe end portion adapted to be inserted into and being rotated in relation to a second pipe end portion. These pipe end portions are provided with matching threaded portions for their mutual engagement. The above mentioned second pipe end portion is provided with a threaded portion the wall thickness of which is substantially identical with the wall thickness of said second pipe. The end portion of said second pipe that extends axially outwards is provided by a conically enlarged portion. The first pipe end portion is provided with a thread portion the wall thickness of which is substantially identical with the wall thickness of said first pipe. An axially inner portion of said first pipe end portion is at least partially conically decreasing towards the threaded portion. A seal ring is arranged to be received in an annular flange portion in order to establishing a sealing between the interior surface of said flange and the conical portion provided on said first pipe end portion. The second pipe end portion is provided with extensions for engagement with holding tools.

BACKGROUND OF THE INVENTION

Until now, deep wells have been lined with galvanized carbon steel screw joint pipes connected to each other by means of internally threaded couplings. The sealing function has been provided by flax or linseed oil. These pipes are heavy to handle since the depth of the well can be as much as 50 m and the wall of the pipe is thick. The thick pipe wall is needed in order to make room for the cut thread. Further, these screw joints have easily become disengaged due to the percussion and vibrations that occur during pumping.

Another well known pipe coupling for thin-walled pipes consists of a male portion and a female portion with matching threaded portions. The male portion has a conical enlargement axially inside the thread which is arranged to elastically force the cylindrical end portion radially outwards so as to make the coupling tightened during the final part of the in-screwing movement. This type of pipe coupling must be threadably engaged by means of machine force in order to provide sufficient force to the pipes so that an elastic deformation of the end portion of the female portion can occur. This end portion is also sensible to percussion.

OBJECTS OF THE INVENTION

It is an object of the present invention to provide an improved pipe joint that can be mounted manually without tools.

It is another object of the invention to provide a pipe joint that is effectively tightened also after small engagement forces.

It is another object of the invention to provide a pipe joint that is rigid but easy to handle.

BRIEF DESCRIPTION OF THE DRAWING

These and other objects of the invention are achieved by the present invention which is described more specifically in conjunction with the attached drawings wherein FIG. 1 is a longitudinal quarter section of a pipe joint in accordance with the present invention, FIG. 2 is a section of a pipe end portion according to FIG. 1, FIG. 3 is a partial longitudinal section of an alternative embodiment of the invention, FIG. 4 is a partial longitudinal section of another alternative embodiment of the invention, and FIG. 5 is a section along the line V—V in FIG. 1.

DETAILED DESCRIPTION OF A PREFERRED EMBODIMENT

Referring now to FIG. 1 a pipe joint is shown generally at 10 including a male pipe portion 11 and a female pipe portion 12. The thread profiles of these pipe portions are preferably pressure-turned at the end of pipes 13 and 14 respectively. The pipes are cylindrical in shape and arranged for the purpose of transmitting fluid therethrough.

Referring now to FIG. 1 the following is a detailed description of a male portion 11 from its upper to its lower portion. The pipe 13 is conically enlarged at 15 followed by a conical section 16 which converges towards a cylindrical section 17 with substantially the same diameter as the pipe 13. The section 17 is terminated by a threaded portion 18 including pressure-turned threads which means that the thickness of the threads is substantially identical with the thickness of the pipe 13. Referring again to FIG. 1 the following is a detailed description of the female portion 12 from its lower to its upper portion. The pipe 14 is conically enlarged at 19 followed by a cylindrical portion 20 the diameter of which is 5–15% larger than the diameter of the pipe 14. This cylindrical section 20 is followed by a threaded portion 21 with pressure-cut threads whereby the general diameter of said portion 21 exceeds the diameter of the pipe 14. The threaded portion 21 is followed by another cylindrical section 22 the diameter of which is substantially identical with the diameter of the section 20.

The section 20 is followed by an annular extension 23 having U-shaped cross-section. The outer diameter of said annular extension 23 is 10–30% larger than the diameter of the pipe 14. This extension 33 is followed by a conically enlarged portion 24. The main purpose of providing said enlarged portion 24 is to facilitate entering the male portion 11 on to the female portion 12. The extension 23 is arranged to receive a seal ring 25, preferably made of nitrile rubber. The interior surface 23a of said extension 23 is mainly flat and disposed parallel with the centre line CL of the pipe joint. The cross-section of said extension can also have other alternative shapes. V-shaped or W-shaped as shown in FIG. 2 and FIG. 3 respectively.

At the engagement the pipe 13 is entered into the female portion 12. The female portion 12 is oriented upwards and supported by a fork-stopper or similar means abutted against the conical portion 19 or the extension 23. Hence, it is preferable to have the pipe string arranged with the female portion oriented upwards in order to prevent it from falling down into the well during mounting and dismounting.

When the thinner male portion 11 is arranged in line with the wider female portion 12 and is displaced downwards the male portion will be centrally arranged towards the conical portion 24 of the female portion whereby the threads 18 will become engaged with the threads 21 until the male portion is stopped. At manual rotation of the male portion in relation to the female portion the male portion will be drawn into the female portion due to the cooperation between said threaded portions. When the conical section 16 of the male portion enters the seal ring 25 and the conical englargement 24 a tight coupling arrangement is achieved between said male and female portions. The surfaces of said threaded portions should be hard and smooth. The female thread portion will be squeezed and locked between the flank portion of the male thread and the conical portion 16 of the male thread. Each flank has an angle inclination a at 2°-6° in relation to a normal to the centre line CL, and the inclination $\beta$ on the conical section 16 is between 3 and 10° in relation to the centre line CL. The thin wall thickness will give a large elasticity which promotes a good locking of the portions to each other. The rounded thread sections will make them less susceptible to damages than threads that are being cut.

The pipe joint has been successfully subjected to test pressing at a pressure of 250 bar by internally applied water pressure without any water leakage. The pipe joint according to the invention has also been subjected to tensile testing whereby the threads were dismounted after reaching stresses of seven ton. The tubes used for these tests were made of ferritic-austenitic stainless steel and had dimension 42.4×1.2 mm. A pipe joint made of stainless steel tubes with dimensions 38×2 mm was successfully subjected to a test pressure exceeding 600 bar by internally applied water pressure without any water leakage.

The thread that is forced into threaded engagement and the annular extension 23 will cooperate in a manner that stiffens or reinforces the pipe ends. Generally the diameter of the pipe joint is 5-20% larger than the diameter of the pipes 13, 14. The above related procedure is reversed at dismounting so that no tooling is needed.

FIG. 5 shows a section along the line V—V in FIG. 1. A sleeve 26 is arranged in abutment with the interior surface of cylindrical section 20. The sleeve 26 is arranged to guide a piston 27 centrally received in the pipes. The piston 27 is arranged in cooperation with a pump arranged at the lower end of the pipe string (not shown). The sleeve has a central hole and four arms that are bent and the ends of which abuts with and engages with the interior surface of the cylindrical section 20.

The above related invention is a pipe joint which can be mounted and dismounted without tooling assistance. This pipe joint has a good tightening ability and high strength.

What is claimed is:
1. A pipe joint comprising:
a first thin-walled pipe having a first end provided with a first thread portion, said first thread portion being formed with a first thread portion wall which has a thickness substantially identical to the thickness of the wall of said first thin-walled pipe, said first thin-walled pipe including a first inner portion which is formed axially inward from said first thread portion and which at least partially conically decreases towards said thread portion and means for engagement by a holding tool;
a second thin-walled pipe having a second end provided with a second thread portion adapted to matingly receive said first thread portion, said second thread portion being formed with a second thread portion wall which has a thickness substantially identical to the thickness of the wall of said second thin-walled pipe, said second thin-walled pipe including a conically enlarged portion formed axially outward from said second thread portion and an annular extension provided adjacent said conically enlarged portion; and
a seal ring arranged to be received in said annular extension and to be tightened between said extension of said second thin-walled pipe and said first inner portion of said first thin-walled pipe when said extension and said inner portion move toward one another during threaded connection of the first and second thin-walled pipes.

2. The pipe joint as defined in claim 1, wherein a radially outermost portion of said annular extension defines the largest diameter of the pipe joint.

3. The pipe joint as defined in claim 1, wherein the general diameter of said joint is larger than the diameter of the tubes.

4. The pipe joint as defined in claim 3, wherein the general diameter of said joint is 1.05-1.2 times larger than the diameter of said tubes.

5. The pipe joint as defined in claim 1, wherein said annular extension is substantially U-shaped in cross-section, the interior surface of said extension being smooth and disposed substantially parallel with the centre line of the pipe joint.

6. The pipe joint as defined in claim 1 wherein said annular extension is substantially V-shaped in cross-section.

7. The pipe joint as defined in claim 1 wherein said annular extension is substantially W-shaped in cross-section.

* * * * *